United States Patent [19]

Ohoka et al.

[11] 4,130,601
[45] Dec. 19, 1978

[54] RESIN COMPOSITION FOR POWDER PAINT

[75] Inventors: Masataka Ohoka, Nara; Mitsuko Yamada, Izumi; Akio Shoji, Osaka; Shunji Arimoto, Izumi-otsu, all of Japan

[73] Assignee: Dainippon Ink and Chemicals, Inc., Tokyo, Japan

[21] Appl. No.: 879,760

[22] Filed: Feb. 21, 1978

[30] Foreign Application Priority Data

Mar. 11, 1977 [JP] Japan .................................. 52-26040

[51] Int. Cl.$^2$ ............................................. C08L 63/02
[52] U.S. Cl. .................................. 260/835; 528/307; 528/308
[58] Field of Search ................. 260/75 T, 75 EP, 835

[56] References Cited

U.S. PATENT DOCUMENTS

| | | | |
|---|---|---|---|
| 3,397,254 | 8/1968 | Wynstra et al. | 260/835 |
| 3,657,191 | 4/1972 | Titzmann et al. | 260/75 T |
| 3,869,427 | 3/1975 | Meschke et al. | 260/47 EP |
| 3,953,403 | 4/1976 | Fujiyoshi et al. | 260/75 T |
| 4,024,111 | 5/1977 | Thomas et al. | 260/75 T |

*Primary Examiner*—Lucille M. Phynes
*Attorney, Agent, or Firm*—Sherman and Shalloway

[57] ABSTRACT

A resin composition for powder paints, said composition comprising (I) 70 to 97% by weight of a polyester resin containing free carboxyl groups in the molecule and having an acid value of 20 to 100 KOH mg/g and a softening point of 70° to 150° C and (II) 3 to 30% by weight of glycidyl p-glycidyloxybenzoate.

6 Claims, No Drawings

RESIN COMPOSITION FOR POWDER PAINT

This invention relates to a polyester-epoxy type resin composition for powder paints which can form a coated film having excellent weatherability, and more specifically to a resin composition for powder paints which comprises a free carboxyl-containing polyester resin and glycidyl p-glycidyloxybenzoate.

German Laid-Open Patent Publication (DT OS) No. 1,905,825 discloses that a linear polyester prepared from a dicarboxylic acid and an excess of a diol is useful as a binder for a powdery lacquer. This linear polyester can be crosslinked with a mixture of triglycidyl isocyanurate and a polycarboxylic anhydride through free hydroxyl groups. However, since this linear polyester has a relative viscosity of 1.51 to 1.55, it must be pulverized while being cooled with carbon dioxide.

In an attempt to remove this inconvenience, various improved resin compositions for powder paint have been suggested. For example, Japanese Laid-Open Patent Publications Nos. 28092/72 and 44100/74 both describe a polyester-epoxy type powder paint comprising a blend of a carboxy-containing polyester resin and a diglycidyl ether of bisphenol A as a curing agent. Cured coatings of this powder paint have superior corrosion resistance and mechanical characteristics but poor weatherability, and will have markedly reduced gloss after a short period of outdoor exposure.

It is an object of this invention therefore to improve the weatherability of cured coatings of a polyester-epoxy type powder paint.

The present inventors have found that this object of the invention can be achieved by using glycidyl p-glycidyloxybenzoate (II) as a curing agent for a carboxy-containing polyester resin (I).

The glycidyl p-glycidyloxybenzoate (II) is expressed by the general formula

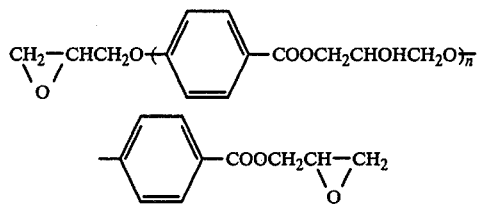

wherein n is 0 or an integer. Preferably, n in the formula is at most 10. The above glycidyl ester ether preferably has a number average molecular weight of about 250 to about 2,200.

The carboxy-containing polyester resin (I) denotes a polyester having an acid value of 20 to 100 (KOH mg/g) and a softening point (measured by the ball and ring method; the method of measuring the softening point is the same throughout this application) of 70° to 150° C. which is obtained by reacting a carboxylic acid component and an alcohol component. Preferably, the polyester resin has a number average molecular weight of about 1,000 to about 7,000.

The carboxylic acid component and the alcohol component may be any of those which are known in the art. Examples of the acid component include terephthalic acid, isophthalic acid, phthalic acid, methylterephthalic acid, trimellitic acid, pyromellitic acid, adipic acid, sebacic acid, succinic acid, maleic acid, fumaric acid, tetrahydrophthalic acid, methyltetrahydrophthalic acid, hexahydrophthalic acid, methylhexahydrophthalic acid, and reactive derivatives of these acids. Examples of the alcohol component are ethylene glycol, propylene glycol, 1,3-butanediol, 1,4-butanediol, 1,6-hexanediol, diethylene glycol, dipropylene glycol, 1,4-cyclohexanedimethanol, neopentyl glycol, isopentyl glycol, bis-hydroxyethyl terephthalate, hydrogenated bisphenol A, an ethylene oxide adduct of hydrogenerated bis-phenol A, trimethylolethane, trimethylolpropane, glycerol, pentaerythriotol, and 2,2,4-trimethylpentane-1,3-diol. Monoepoxy compounds can also be used as the alcohol component.

Favorable results can be obtained if at least 70 mole% of the carboxylic acid component consists of an aromatic dicarboxylic acid, and at least 40 mole% of the alcohol component consists of an aliphatic diol having at least 4 carbon atoms and 3 to 30 mole% of it consists of a cyclohexane ring-containing polyhydric alcohol.

The composition of this invention comprises 70 to 97% by weight, preferably 80 to 95% by weight, of the carboxy-containing polyester resin (I) and 3 to 30% by weight, preferably 5 to 25% by weight, of the glycidyl p-glycidyloxybenzoate (II). If the amount of the glycidyl p-glycidyloxybenzoate (II) exceeds 30% by weight, the resulting powder paint has reduced antiblocking property and the weatherability of the cured coating is reduced. On the other hand, if its amount is below 3% by weight, the curing of the coating is insufficient, and the cured coating has reduced mechanical strength and solvent resistance.

Since the composition of this invention has good curability, a powder paint prepared from it can be fully cured under ordinary baking conditions (at a temperature of, say, at least 150° C., preferably 160° to 230° C.). To cure it at lower temperatures of within shorter periods of time, curing accelerators, for example a tertiary amine such as triethylamine or triethanolamine, an imidazole derivative such as 2-methylimidazole, and a carboxylic acid metal salt such as tin octylate may be added as required. The imidazole derivatives are especially useful because they also have the ability to inhibit the formation of pinholes on the surface of a coated film.

A powder paint can be prepared suitably by a method which involves melt-kneading the composition of this invention with a flow agent such as a 2-ethylhexyl acrylate polymer, as n-butyl acrylate polymer, a silicon compound or a fluorine compound, fillers including pigments, and if desired, a catalyst and other additives, and finely pulverizing the resulting mixture. Cured coatings having superior mechanical strength, weatherability, brightness and corrosion resistance can be formed by coating the resulting powder paint on a substrate and baking the coating at a temperature of at least 150° C., preferably 160° to 230° C.

The following examples illustrate the present invention in greater detail. All parts in these examples are by weight unless otherwise specified.

REFERENTIAL EXAMPLE 1

Synthesis of polyester resin (I-1)

A mixture consisting of 1,046 parts of neopentyl glycol, 119 parts of 1,4-cyclohexanedimethanol, 1,000 parts of dimethyl terephthalate and 1.1 parts of zinc acetate was heated at 150° C. for 1 hour and then at 210° C. for 2 hours while methanol formed was removed out of the reaction system. Then, 47 parts of trimethylolpropane, 800 parts of terephthalic acid, and 1.5 parts of dibutyltin oxide were added. The mixture was maintained at this temperature for 4 hours, and then heated at 240° C. for 10 hours. The temperature of the reaction mixture was lowered to 180° C., and 313 parts of trimellitic anhydride was added. The mixture was maintained at this temperature for 3 hours to afford a polyester resin (I-1) having a number average molecular weight of 3,400, a softening point of 125° C. and an acid value of 62.

REFERENTIAL EXAMPLE 2

Synthesis of polyester resin (I-2)

Neopentyl glycol (1,777 parts), 310 parts of 1,4-cyclohexanedimethanol, 70 parts of 1,6-hexanediol, 1,830 parts of dimethyl terephthalate, 1,407 parts of terephthalic acid and 316 parts of trimellitic anhydride were used, and the same procedure as in Referential Example 1 was repeated to afford a polyester resin (I-2) having a number average molecular weight of 4,300, a softening point of 120° C. and an acid value of 42.

EXAMPLES 1 TO 3

Polyester resin (I-1) or (I-2), glycidyl p-glycidyloxybenzoate (II-1) or (II-2) [(II-1) has a number average molecular weight of 280 and an epoxy equivalent of 140; and (II2) has a number average molecular weight of 340 and an epoxy equivalent of 170], poly(n-butyl acrylate) having a number average molecular weight of about 20,000 (used as a flow agent), 2-methylimidazole and titanium dioxide were dry-blended in the amounts in parts by weight indicated in the following table. The blend was then melt-kneaded by a "Ko-Kneader" (a product of Buss Company, Switzerland), then finely pulverized, and passed through a 150-mesh wire gauze to form a white powder paint.

The powder paint was coated on a zinc phosphate-treated steel plate by an electrostatic spray method, and baked at 180° C. for 15 minutes to form a cured coating having a thickness of about 60 microns. The properties of the coating and the storage stability of the powder paint were measured, and the results are tabulated below.

The salt spray resistance was determined by providing cuts on the coating formed on the steel plate by a knife, spraying a 5% aqueous solution of sodium chloride at 35° C. onto the coating for 500 hours, applying an adhesive "Cellotape" to the cut portions, pulling it off, and measuring the peeled width of the coating. The weatherability is expressed by the rate (%) of gloss retention after exposing the coating formed on the steel plate outdoors for a predetermined period of time.

|  | Example 1 | Example 2 | Example 3 |
|---|---|---|---|
| Polyester resin (I-1) | 85 | — | — |
| Polyester resin (I-2) | — | 91 | 89 |
| Glycidyl ester ether (II-1) | 15 | 9 | — |
| Glycidyl ester ether (II-2) | — | — | 11 |
| Poly(n-butyl acrylate) | 0.5 | 0.5 | 0.5 |
| 2-Methylimidazole | 0.1 | 0.1 | 0.1 |
| Titanium dioxide | 43 | 43 | 43 |
| Smoothness | Good | Good | Good |
| Brightness | Good | Good | Good |
| Gloss at 60° reflection (%) | 97 | 98 | 95 |
| Erichsen (mm) | >7 | >7 | >7 |
| Impact resistance (500 g × cm) | >50 | >50 | >50 |
| Salt spray resistance (mm) | 0 | 0 | 0 |
| Weatherability (%) |  |  |  |
| After 6-month exposure | 83 | 89 | 80 |
| After 12-month exposure | 72 | 78 | 70 |
| Storage stability (at 35° C for 1 month) | No blocking | No blocking | No blocking |

What we claim is:

1. A resin composition for powder paints, said composition comprising (I) 70 to 97% by weight of a polyester resin containing free carboxyl groups in the molecule and having an acid value of 20 to 100 KOH mg/g and a softening point of 70° to 150° C. and (II) 3 to 30% by weight of glycidyl p-glycidyloxybenzoate.

2. The composition of claim 1 wherein at least 70% of the entire carboxylic acid component of the polyester resin (I) consists of an aromatic dicarboxylic acid.

3. The composition of claim 1 wherein at least 40 mole% of the entire alcohol component of the polyester resin (I) consists of an aliphatic diol with 4 to 6 carbon atoms, and 3 to 30 mole% of it consists of a cyclohexane ring-containing polyhydric alcohol.

4. The composition of claim 1 wherein the glycidyl p-glycidyloxybenzoate (II) is expressed by the general formula

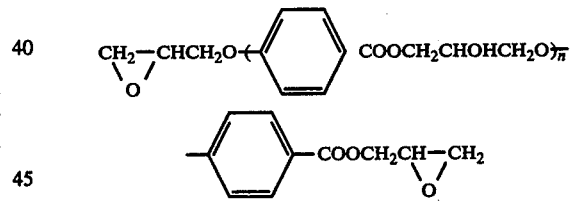

wherein n is 0 or an integer of 1 to 10.

5. The composition of claim 3 wherein at least 70% of the entire carboxylic acid component of the polyester (I) consists of an aromatic dicarboxylic acid.

6. The composition of claim 1 which comprises 80–95% by weight of said polyester resin (I) and 5–25% by weight of said glycidyl p-glycidyloxybenzoate (II).